United States Patent
Toyooka et al.

(10) Patent No.: US 9,772,547 B2
(45) Date of Patent: *Sep. 26, 2017

(54) PROJECTOR

(71) Applicant: SEIKO EPSON CORPORATION, Tokyo (JP)

(72) Inventors: Takashi Toyooka, Matsumoto (JP); Makoto Zakoji, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/964,516

(22) Filed: Dec. 9, 2015

(65) Prior Publication Data

US 2016/0231643 A1 Aug. 11, 2016

Related U.S. Application Data

(63) Continuation of application No. 14/609,199, filed on Jan. 29, 2015, now Pat. No. 9,244,338, which is a (Continued)

(30) Foreign Application Priority Data

Nov. 9, 2010 (JP) ................. 2010-250686

(51) Int. Cl.
*G03B 21/14* (2006.01)
*H04N 9/31* (2006.01)
(Continued)

(52) U.S. Cl.
CPC ......... *G03B 21/142* (2013.01); *G02B 26/008* (2013.01); *G03B 21/006* (2013.01);
(Continued)

(58) Field of Classification Search
CPC .... G03B 21/204; G03B 21/14; H04N 9/3111; H04N 9/3123; H04N 9/3114; H04N 9/3152; F21S 10/007; G02B 26/008
See application file for complete search history.

(56) References Cited

U.S. PATENT DOCUMENTS

| 5,523,803 A | 6/1996 | Urbanus et al. |
| 5,706,061 A | 1/1998 | Marshall et al. |
| (Continued) | | |

FOREIGN PATENT DOCUMENTS

| CN | 101366275 A | 2/2009 |
| JP | 2003-162001 A | 6/2003 |
| (Continued) | | |

OTHER PUBLICATIONS

International Search Report and written opinion dated Jan. 25, 2012 in application No. PCT/JP2011/005477.
(Continued)

*Primary Examiner* — William C Dowling
(74) *Attorney, Agent, or Firm* — Maschoff Brennan

(57) ABSTRACT

A projector can prevent a flicker from being caused by rotation of a rotating phosphor plate. The projector includes a solid-state light source that emits excitation light, a rotating phosphor plate that converts the excitation light into phosphor light, a liquid-crystal light modulating device that modulates the light from the rotating phosphor plate, a projection optical system that projects the modulated light onto a screen, and a control device that controls the solid-state light source and the rotating phosphor plate so as to satisfy any one of a conditional expression A=B, a conditional expression A=2B, and a conditional expression |A−B| is greater than or equal to 20 and |A−2B| is greater than or equal to 20, where A represents a pulse width modulation control frequency in hertz of the solid-state light source and
(Continued)

B represents a rotation frequency in hertz of the rotating phosphor plate.

10 Claims, 7 Drawing Sheets

Related U.S. Application Data continuation of application No. 13/884,241, filed as application No. PCT/JP2011/005477 on Sep. 28, 2011, now Pat. No. 9,274,406.

(51) Int. Cl.
  *G02B 26/00* (2006.01)
  *G03B 21/20* (2006.01)
  *G03B 33/10* (2006.01)
  *G03B 21/00* (2006.01)

(52) U.S. Cl.
  CPC .......... *G03B 21/14* (2013.01); *G03B 21/204* (2013.01); *G03B 33/10* (2013.01); *H04N 9/315* (2013.01); *H04N 9/3114* (2013.01); *H04N 9/3152* (2013.01); *H04N 9/3155* (2013.01)

(56) References Cited

U.S. PATENT DOCUMENTS

| | | | |
|---|---|---|---|
| 6,886,964 B2 | 5/2005 | Gardiner et al. | |
| 7,180,554 B2 | 2/2007 | Divelbiss et al. | |
| 7,357,513 B2 | 4/2008 | Watson et al. | |
| 7,517,093 B2 | 4/2009 | Nakagawa et al. | |
| 7,841,723 B2 | 11/2010 | Tanaka | |
| 8,040,440 B2 | 10/2011 | Haraguchi et al. | |
| 2004/0100589 A1 | 5/2004 | Ben-David et al. | |
| 2006/0132721 A1 | 6/2006 | Gerets | |
| 2007/0019408 A1 | 1/2007 | McGuire, Jr. et al. | |
| 2007/0180953 A1 | 8/2007 | Uchikoshi et al. | |
| 2007/0229777 A1 | 10/2007 | Tanaka | |
| 2009/0187234 A1 | 7/2009 | Meyer et al. | |
| 2009/0189845 A1 | 7/2009 | Toyooka | |
| 2009/0284148 A1 | 11/2009 | Iwanaga | |
| 2010/0201894 A1 | 8/2010 | Nakayama et al. | |
| 2010/0238412 A1 | 9/2010 | Kurosaki et al. | |
| 2011/0043764 A1 | 2/2011 | Narikawa | |
| 2011/0043765 A1 | 2/2011 | Shibasaki | |
| 2012/0320109 A1 | 12/2012 | Shibasaki | |
| 2013/0107223 A1 | 5/2013 | Toyooka | |

FOREIGN PATENT DOCUMENTS

| | | |
|---|---|---|
| JP | 2008-145484 A | 6/2008 |
| JP | 2009-175627 A | 8/2009 |
| JP | 2009-277516 A | 11/2009 |
| JP | 2009-539219 A | 11/2009 |
| JP | 2010-085745 A | 4/2010 |
| JP | 2010-217566 A | 9/2010 |
| JP | 2010-224493 A | 10/2010 |
| JP | 2011-043719 A | 3/2011 |
| JP | 2011-044367 A | 3/2011 |
| KR | 2008-0094831 A | 10/2008 |
| WO | 95/11572 | 4/1995 |
| WO | 20071119510 | 10/2007 |
| WO | 2008152397 A2 | 12/2008 |
| WO | 20091017992 | 2/2009 |
| WO | 2009142015 A1 | 11/2009 |

OTHER PUBLICATIONS

International Preliminary Report on Patentability dated May 14, 2013 in application No. PCT/JP2011/005477.

[Fig. 1]
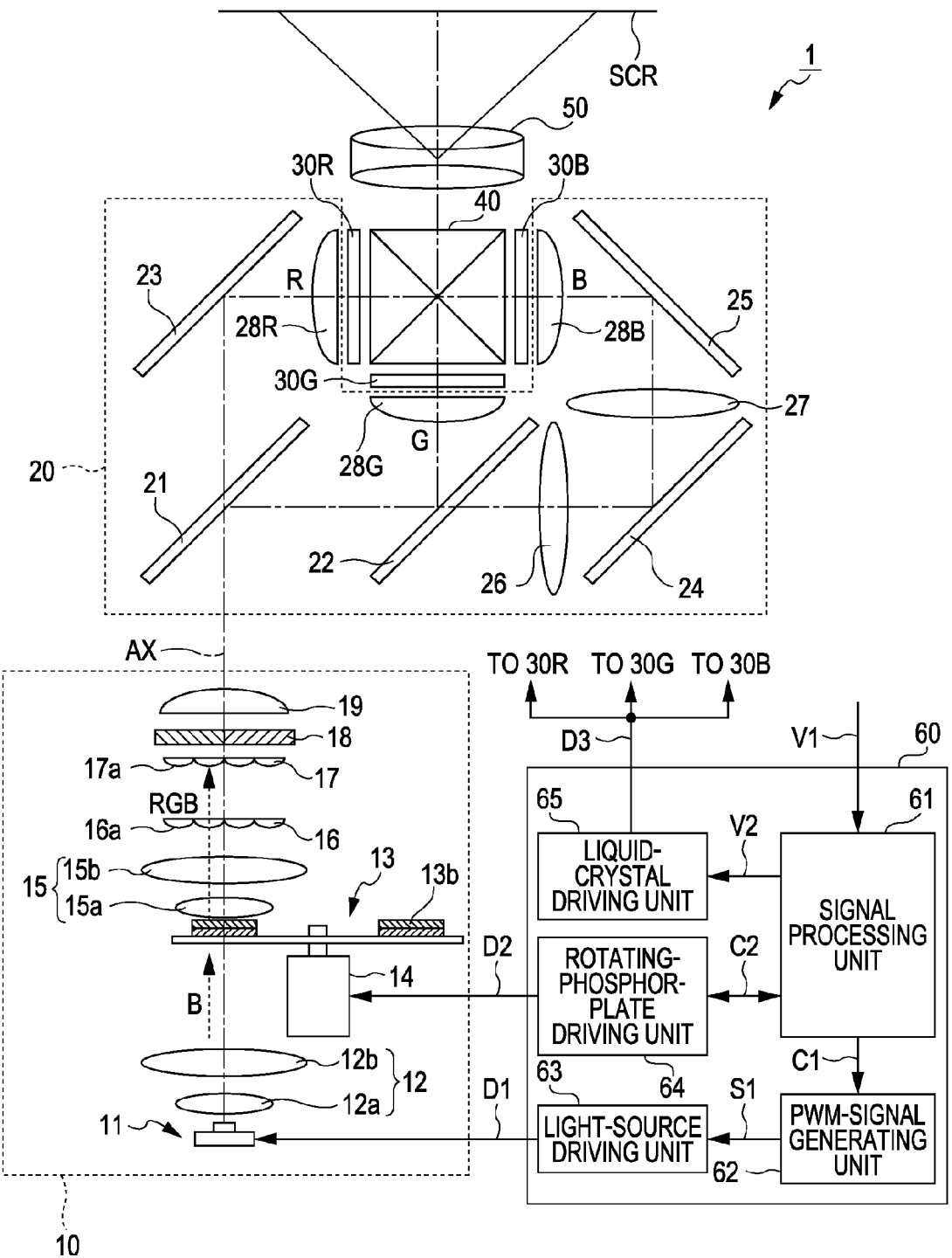

[Fig. 2A]
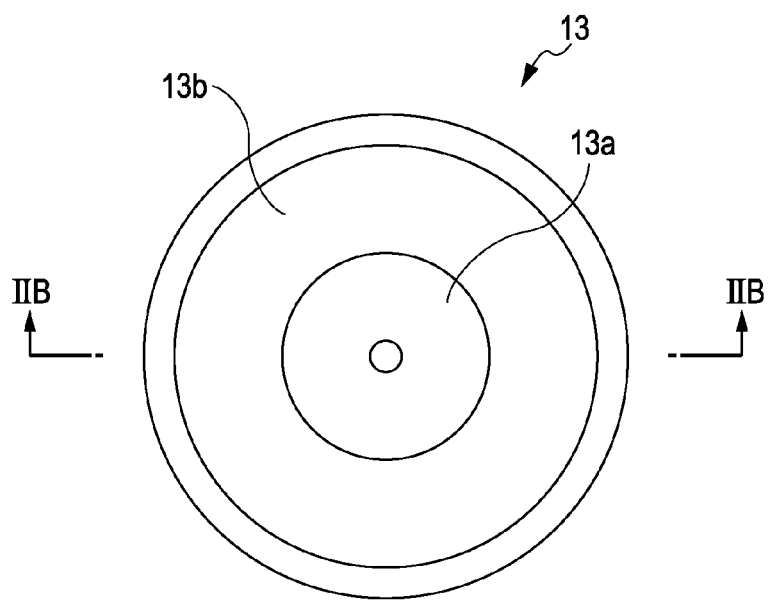
[Fig. 2B]
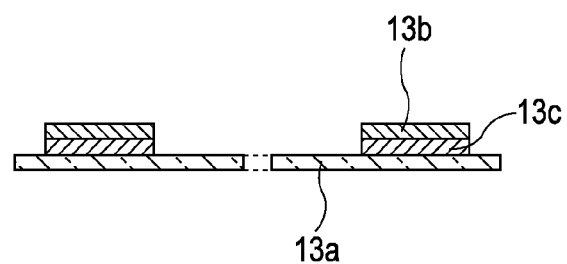

[Fig. 3A]
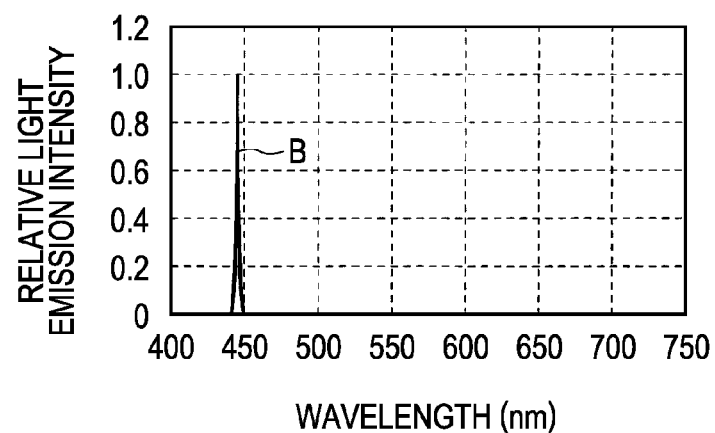
[Fig. 3B]
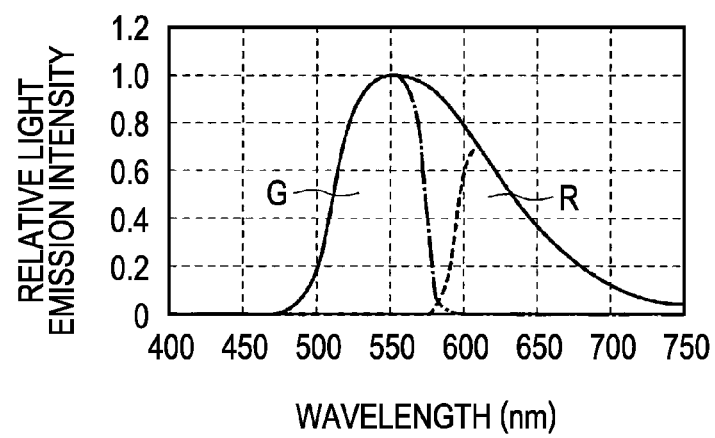

[Fig. 4A]

ROTATION FREQUENCY OF ROTATING PHOSPHOR PLATE: 100 Hz

| PWM CONTROL FREQUENCY | VISUAL JUDGMENT RESULT |
|---|---|
| 100 (×1) | OK |
| 101 | NG |
| 105 | NG |
| 110 | NG |
| 115 | NG |
| 120 | OK |
| 150 | OK |
| 180 | OK |
| 190 | NG |
| 200 (×2) | OK |
| 205 | NG |
| 210 | NG |
| 220 | OK |
| 250 | OK |
| 280 | OK |
| 290 | OK |
| 300 (×3) | OK |
| 305 | OK |
| 310 | OK |
| 320 | OK |
| 405 | OK |
| 505 | OK |

[Fig. 4B]

ROTATION FREQUENCY OF ROTATING PHOSPHOR PLATE: 150 Hz

| PWM CONTROL FREQUENCY | VISUAL JUDGMENT RESULT |
|---|---|
| 150 (×1) | OK |
| 151 | NG |
| 155 | NG |
| 160 | NG |
| 165 | NG |
| 170 | OK |
| 200 | OK |
| 250 | OK |
| 280 | OK |
| 290 | NG |
| 300 (×2) | OK |
| 305 | NG |
| 310 | NG |
| 320 | OK |
| 350 | OK |
| 400 | OK |
| 430 | OK |
| 440 | OK |
| 450 (×3) | OK |
| 455 | OK |
| 460 | OK |
| 470 | OK |

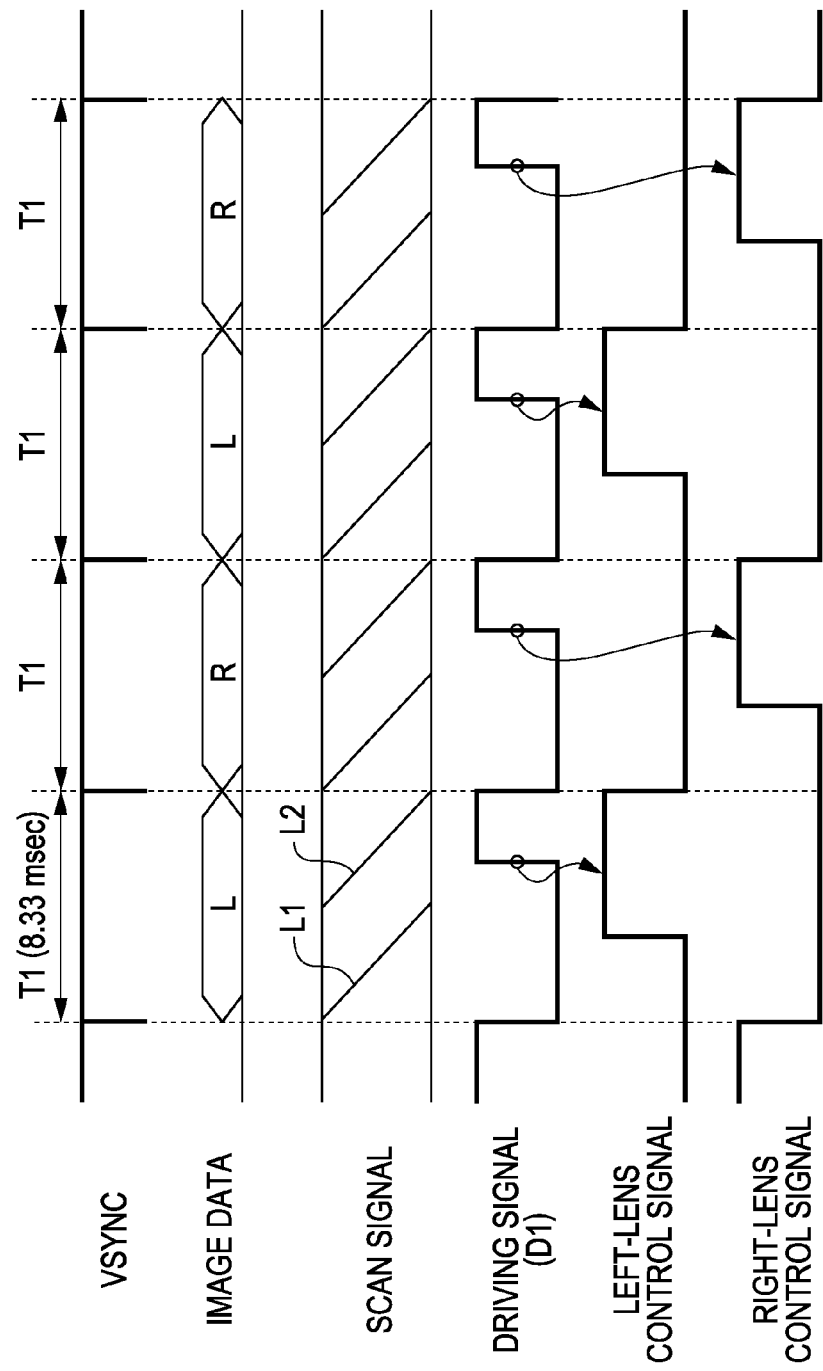

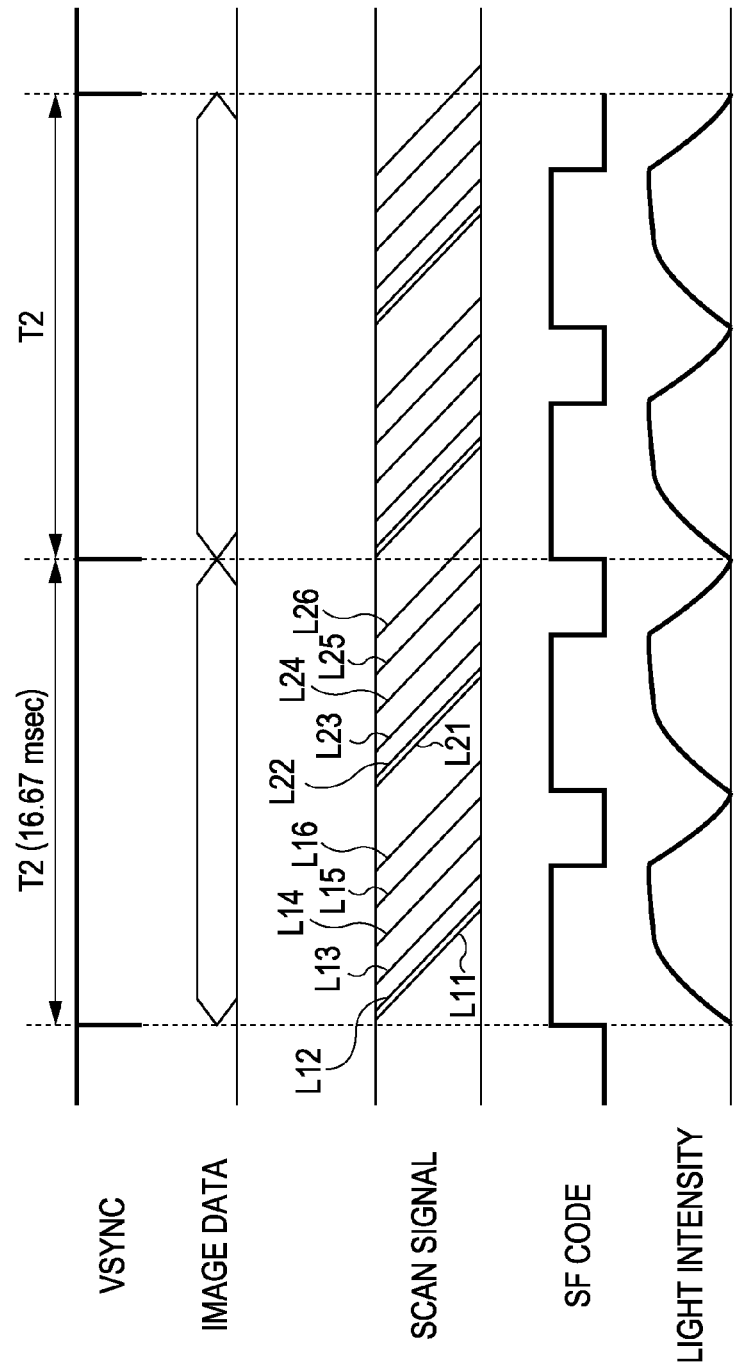

PROJECTOR

CROSS-REFERENCE TO RELATED APPLICATIONS

This application is a continuation of U.S. application Ser. No. 14/609,199, filed Jan. 29, 2015, which is a continuation of U.S. application Ser. No. 13/884,241, which is the U.S. national stage of International Application No. PCT/JP2011/005477, filed Sep. 28, 2011, which claims priority to Japan Application No. 2010-250686 filed on Nov. 9, 2010. The foregoing patent applications are incorporated herein by reference.

FIELD OF INVENTION

The present invention relates to a projector.

BACKGROUND ART

As is well known, a projector includes a light source, a light modulating device, and a projection lens. The projector modulates light emitted from the light source by the light modulating device and displays an image on a screen by projecting the modulated light onto the screen through the projection lens. While a typical projector of the related art includes, as a light source, a lamp such as a halogen lamp, a metal halide lamp, or a high-pressure mercury lamp, projectors including a solid-state light source, such as a laser diode (LD) or a light emitting diode (LED), have recently been actively developed for reduction of power consumption, size, and weight.

One type of projector including a solid-state light source obtains red light, green light, and blue light necessary for color display by exciting a phosphor material with light emitted from the solid-state light source (e.g., blue laser light or ultraviolet laser light). Since such a projector can obtain three color lights (red light, green light, and blue light) necessary for color display by using only one solid-state light source, cost and size reduction is possible compared to a projector including a plurality of solid-state light sources.

The following PTL 1 discloses a technique that changes the light emitting and non-emitting period of a solid-state light source provided in an image forming apparatus so as to prevent scroll noise from being caused by pulse width modulation (PWM) of the solid-state light source. Here, the term "scroll noise" is a phenomenon in which band-shaped bright and dark portions extending in the lateral direction of the screen slowly move upward or downward on the screen. Further, the following PTL 2 discloses a technique that ensures a long life of a phosphor material provided in a projector by rotating the phosphor material to reduce damage due to light emitted from a solid-state light source.

CITATION LIST

JP-A-2009-175627
JP-A-2009-277516

SUMMARY OF INVENTION

In the projector including the solid-state light source, the solid-state light source is PWM-controlled at a control frequency of about several hundred hertz so that a flicker is not visually recognized by the user. Further, in the above-described projector having the phosphor material, a rotating phosphor plate having the phosphor material is rotated at a rotation speed of about 120 rotations per second (120 Hz) so that damage due to light emitted from the solid-state light source is avoided and a flicker due to the rotation is not recognized visually.

A flicker resulting from PWM control of the solid-state light source and a flicker resulting from rotation of the rotating phosphor plate both mainly include a high-frequency component that is not visually recognized by the user. However, both flickers interfere with each other to produce a low-frequency component. This causes a flicker visible to the user, and degrades the image display quality.

The light modulating device provided in the projector is also driven at a frequency such that a flicker is not visually recognized by the user (e.g., 60 Hz). However, a flicker resulting from rotation of the rotating phosphor plate and a flicker resulting from driving of the light modulating device interfere with each other, and a flicker visible to the user also occurs. This degrades the image display quality.

The present invention has been made in view of the above-described circumstances, and an object of the invention is to provide a projector that can prevent a flicker from being caused by rotation of a rotating phosphor plate.

A projector according to a first aspect of the present invention includes a solid-state light source that emits excitation light, a rotating phosphor plate that converts the excitation light into phosphor light, a light modulating device that modulates the light from the rotating phosphor plate, a projection optical system that projects the light modulated by the light modulating device onto a screen, and a control device that controls the solid-state light source and the rotating phosphor plate so that any one of the following conditional expressions is satisfied:

$A = B$ $A = 2B$ $|A-B|$ is greater than or equal to 20 and $|A-2B|$ is greater than or equal to 20 where A represents a pulse width modulation control frequency in hertz of the solid-state light source and B represents a rotation frequency in hertz of the rotating phosphor plate.

According to the first aspect of the invention, the control device controls the solid-state light source and the light modulating device so that the pulse width modulation control frequency of the solid-state light source is equal to the rotation frequency of the rotating phosphor plate according to the above first conditional expression, so that the pulse width modulation control frequency of the solid-state light source is double the rotation frequency of the rotating phosphor plate according to the second conditional expression, or so that an absolute value of a difference between the pulse width modulation control frequency of the solid-state light source and the rotation frequency of the rotating phosphor plate or an absolute value of a difference between the pulse width modulation control frequency of the solid-state light source and the double of the rotation frequency of the rotating phosphor plate is not less than 20 hertz according to the third conditional expression. For this reason, it is possible to prevent a flicker of a low-frequency component (visible flicker) from being caused by interference between a flicker resulting from pulse width modulation control of the solid-state light source and a flicker resulting from rotation of the rotating phosphor plate.

In the projector of the first aspect of the invention, preferably, the pulse width modulation control frequency of the solid-state light source is higher than or equal to a frame frequency of an image to be displayed on the screen.

A projector according to a second aspect of the present invention includes a solid-state light source that emits excitation light, a rotating phosphor plate that converts the excitation light into phosphor light, a light modulating device that modulates the light from the rotating phosphor plate, a projection optical system that projects the light modulated by the light modulating device onto a screen, and a control device that controls the rotating phosphor plate and the light modulating device so that any one of the following conditional expressions is satisfied:

$n \times C = 2B$ ($n$ is any one of integers of 1 or more)

$|(n/2) \times C - B|$ is greater than or equal to 20 ($n$ is any of integers of 1 or more)

where B represents a rotation frequency in hertz of the rotating phosphor material and C represents a driving frequency in hertz of the light modulating device.

According to the second aspect of the invention, the control device controls the rotating phosphor plate and the light modulating device so that the rotation speed of the rotating phosphor plate is equal to n/2 times the driving frequency of the light modulating device according to the above first conditional expression or so that an absolute value of a difference between the rotation frequency of the rotating phosphor plate and n/2 times the driving frequency of the light modulating device is not less than 20 hertz. For this reason, it is possible to prevent a flicker of a low-frequency component (visible flicker) from being caused by interference between a flicker resulting from rotation of the rotating phosphor plate and a flicker resulting from driving of the light modulating device.

In the projector of the second aspect of the invention, preferably, the driving frequency of the light modulating device is equal to a frame frequency of an image to be displayed on the screen.

Preferably, the projector of the second aspect of the invention further includes a driving unit that conducts digital driving on the light modulating device while changing a ratio of a time in which the light from the rotating phosphor plate is transmitted and a time in which the light is not transmitted, according to a gray level of an image to be displayed on the screen.

In the projectors according to the first and second aspects of the invention, preferably, the rotating phosphor plate includes a phosphor material that converts the excitation light into the phosphor light and that is continuously provided in a circumferential direction of a disc to be rotated by a motor.

In the projectors according to the first and second aspects of the invention, preferably, the solid-state light source emits blue light as the excitation light, and the phosphor material converts the blue light from the solid-state light source into light including red light and green light.

Alternatively, in the projectors according to the first and second aspects of the invention, preferably, the solid-state light source emits violet light or ultraviolet light as the excitation light, and the phosphor material converts the violet light or the ultraviolet light from the solid-state light source into light including red light, green light, and blue light.

BRIEF DESCRIPTION OF DRAWINGS

FIG. 1 is a block diagram illustrating a configuration of the principal part of a projector according to a first embodiment of the present invention.

FIG. 2A is a structural view of a rotating phosphor plate provided in the projector of the first embodiment.

FIG. 2B is a structural view of the rotating phosphor plate provided in the projector of the first embodiment.

FIG. 3A shows a characteristic of a phosphor material of the rotating phosphor plate provided in the projector of the first embodiment.

FIG. 3B shows a characteristic of the phosphor material of the rotating phosphor plate provided in the projector of the first embodiment.

FIG. 4A is a table showing a visual judgment result of a flicker caused when a PWM control frequency of a solid-state light source in the first embodiment is changed.

FIG. 4B is a table showing a visual judgment result of a flicker caused when the PWM control frequency of the solid-state light source in the first embodiment is changed.

FIG. 5 is a timing chart showing signals used in the projector of the first embodiment.

FIG. 6 is a timing chart showing signals used in a projector according to a second embodiment of the present invention.

DESCRIPTION OF EMBODIMENTS

Projectors according to embodiments of the present invention will be described in detail below with reference to the drawings. The following embodiments are just exemplary embodiments of the present invention, and do not limit the present invention. Various modifications can be arbitrarily made within the scope of the technical idea of the invention.

First Embodiment

FIG. 1 is a block diagram illustrating a configuration of the principal part of a projector 1 according to a first embodiment of the present invention. As illustrated in FIG. 1, the projector 1 of the first embodiment includes an illumination device 10, a color separating and guiding optical system 20, liquid-crystal light modulating devices 30R, 30G, and 30B (light modulating devices), a cross dichroic prism 40, a projection optical system 50, and a control device 60. The projector 1 projects image light onto a screen SCR according to an externally input image signal V1 so as to display an image on the screen SCR. The projector 1 can display a three-dimensional (3-D) image on the screen SCR.

The illumination device 10 includes a solid-state light source 11, a light collecting optical system 12, a rotating phosphor plate 13, a motor 14, a collimator optical system 15, a first lens array 16, a second lens array 17, a polarization conversion element 18, and a superimposing lens 19. The illumination device 10 emits white light including red light, green light, and blue light. The solid-state light source 11 emits, as excitation light, blue light formed by laser light (peak light emission intensity: about 445 nm, see FIG. 3A).

For example, the solid-state light source 11 can include a single semiconductor laser element, or a plurality of semiconductor laser elements arranged in a planar form. When the solid-state light source 11 includes a plurality of semiconductor laser elements, high-intensity blue light can be obtained. While the solid-state light source 11 emits blue light having a peak light emission intensity of 445 nm in the first embodiment, it may emit blue light having a different peak light emission intensity (e.g., about 460 nm). The light collecting optical system 12 includes a first lens 12a and a second lens 12b, and is provided in an optical path between the solid-state light source 11 and the rotating phosphor plate 13. The light collecting optical system 12 collects blue light emitted from the solid-state light source 11 onto a position near the rotating phosphor plate 13.

The rotating phosphor plate 13 converts a part of blue light collected as excitation light by the light collecting optical system 12 into phosphor light including red light and green light. The rotating phosphor plate 13 is rotatably supported by the motor 14. FIGS. 2A and 2B are structural views of the rotating phosphor plate 13 provided in the projector 1 of the first embodiment. FIG. 2A is a front view of the rotating phosphor plate 13, and FIG. 2B is a cross-sectional view taken along line IIB-IIB of FIG. 2A. As illustrated in FIGS. 2A and 2B, in the rotating phosphor plate 13, a phosphor material 13b serving as a single phosphor layer is provided on one surface of a transparent disc 13a continuously in a circumferential direction of the disc 13a.

The disc 13a is formed of a material that transmits blue light, such as quartz glass, crystal, sapphire, optical glass, or transparent resin. The disc 13a has, at its center, a hole in which a rotation shaft of the motor 14 is fitted. The phosphor material 13b converts a part of blue light from the solid-state light source 11 into light including red light and green light (phosphor light), and transmits the remaining part of the blue light without conversion. For example, the phosphor material 13b can be formed of YAG phosphor containing (Y, GD)$_3$(Al, Ga)$_5$O$_{12}$:Ce. As illustrated in FIG. 2B, the phosphor material 13b is provided on one surface of the disc 13a with a dichroic film 13c being disposed therebetween. The dichroic film 13c transmits blue light and reflects red light and green light.

FIGS. 3A and 3B show a characteristic of the phosphor material 13b of the rotating phosphor plate 13 provided in the projector 1 of the first embodiment. FIG. 3A shows the spectrum of blue light incident on the phosphor material 13b, and FIG. 3B shows the spectrum of phosphor light converted by the phosphor material 13b. The phosphor material 13b provided in the rotating phosphor plate 13 converts a part of blue light (B) having the spectrum shown in FIG. 3A into yellow light (phosphor light) including red light (R) and green light (G) shown in FIG. 3B.

In FIG. 3A, reference letter B represents a color light component emitted as excitation light (blue light) from the solid-state light source 11. In FIG. 3B, reference letter R represents a color light component, of the phosphor light converted by the phosphor material 13b, which is available as red light, and reference letter G represents a color component, of the phosphor light converted by the phosphor material 13b, which is available as green light. That is, when blue light is incident on the phosphor material 13b, red light and green light converted by the phosphor material 13b and blue light passing through the phosphor material 13b provide three color lights necessary for color display.

The rotating phosphor plate 13 having the above-described structure is placed with a surface having the phosphor material 13b facing a side opposite an incident side of blue light from the solid-state light source 11 so that the blue light is incident on the phosphor material 13b from a disc 13a side. Further, the rotating phosphor plate 13 is located near a light collecting position of the light collecting optical system 12 so that blue light is constantly incident on a region where the phosphor material 13b is provided in a state in which the rotating phosphor plate 13 is being rotated by the motor 14.

During use, the rotating phosphor plate 13 is rotated by the motor 14, for example, at a rotation speed (rotation frequency) of about 3600 to 12000 rpm (60 to 200 Hz). The diameter of the rotating phosphor plate 13 is 50 mm, and the position where blue light collected by the light collecting optical system 12 is incident on the rotating phosphor plate 13 is set at a position at a distance of about 22.5 mm from the rotation center of the rotating phosphor plate 13. That is, the rotating phosphor plate 13 is rotated by the motor 14 at a rotation speed such that the light collecting spot of blue light moves on the phosphor material 13b at a speed of about 18 m/s.

Returning to FIG. 1, the collimator optical system 15 includes a first lens 15a and a second lens 15b, and converts light from the rotating phosphor plate 13 into substantially parallel light. The first lens array 16 includes a plurality of microlenses 16a, and splits the substantially parallel light from the collimator optical system 15 into a plurality of partial light beams. More specifically, the microlenses 16a of the first lens array 16 are arranged in a matrix with a plurality of rows and a plurality of columns in a plane orthogonal to an illumination optical axis AX. The outer shape of the microlenses 16a of the first lens array 16 is substantially similar to the outer shape of image forming regions of the liquid-crystal light modulation devices 30R, 30G, and 30B.

The second lens array 17 includes a plurality of microlenses 17a corresponding to the microlenses 16a of the first lens array 16. That is, the microlenses 17a of the second lens array 17 are arranged in a matrix with a plurality of rows and a plurality of columns in a plane orthogonal to the illumination optical axis AX, similarly to the microlenses 16a of the first lens array 16. The second lens array 17 forms images on the microlenses 16a of the first lens array 16 near the image forming regions of the liquid-crystal light modulating devices 30R, 30G, and 30B, in cooperation with the superimposing lens 19.

The polarization conversion element 18 includes a polarization separation layer, a reflective layer, and a retardation plate that are not illustrated. The polarization conversion element 18 converts the split partial light beams from the first lens array 16 into about one type of linearly polarized light polarized in the same polarizing direction. The polarization separation layer transmits one of polarization light components included in the light from the rotating phosphor plate 13, and reflects the other linearly polarized light component in a direction perpendicular to the illumination optical axis AX. The reflective layer reflects the other linearly polarized light component, which is reflected by the polarization separation layer, in a direction parallel to the illumination optical axis AX. The retardation plate converts the other linearly polarized light component reflected by the reflective layer into the one linearly polarized light component.

The superimposing lens 19 is located such that the optical axis thereof coincides with the optical axis of the illumination device 10. The superimposing lens 19 collects and superimposes the partial light beams from the polarization conversion element 18 near the image forming regions of the liquid-crystal light modulating devices 30R, 30G, and 30B. The first lens array 16, the second lens array 17, and the superimposing lens 19 described above constitute a lens integrator optical system that uniformizes the light from the solid-state light source 11.

The color separating and guiding optical system 20 includes dichroic mirrors 21 and 22, reflecting mirrors 23 to 25, relay lenses 26 and 27, and light collecting lenses 28R, 28G, and 28B. The color separating and guiding optical system 20 splits the light from the illumination device 10 into red light, green light, and blue light, and guides the red light, the green light, and the blue light to the liquid-crystal light modulating devices 30R, 30G, and 30B, respectively. Each of the dichroic mirrors 21 and 22 has a wavelength-selective transparent film provided on a transparent substrate. The wavelength-selective transparent film reflects light in a predetermined wavelength region, and transmits light in the other wavelength region. More specifically, the dichroic mirror 21 transmits a red light component and reflects a green light component and a blue light component. The dichroic mirror 22 reflects the green light component and transmits the blue light component.

The reflecting mirror 23 reflects a red light component, and the reflecting mirrors 24 and 25 reflect a blue light component. The relay lens 26 is provided between the dichroic mirror 22 and the reflecting mirror 24, and the relay lens 27 is provided between the reflecting mirror 24 and the reflecting mirror 25. These relay lenses 26 and 27 are used to prevent the light utilization efficiency from being reduced by light diffusion because the optical path of the blue light component is longer than the optical paths of the other color light components. The light collecting lenses 28R, 28G, and 28B collect the red light component reflected by the reflecting mirror 23, the green light component reflected by the dichroic mirror 22, and the blue light component reflected by the reflecting mirror 25, respectively, to the image forming regions of the liquid-crystal light modulating devices 30R, 30G, and 30B.

The red light component passing through the dichroic mirror 21 is reflected by the reflecting mirror 23, and enters the image forming region of the liquid-crystal light modulating device 30R for red light via the light collecting lens 28R. The green light component reflected by the dichroic mirror 21 is reflected by the dichroic mirror 22, and enters the image forming region of the liquid-crystal light modulating device 30G for green light via the light collecting lens 28G. The blue light component reflected by the dichroic mirror 21 and passing through the dichroic mirror 22 enters the image forming region of the liquid-crystal light modulating device 30B for blue light after passing through the relay lens 26, the reflecting mirror 24, the relay lens 27, the reflecting mirror 25, and the light collecting lens 28B in order.

The liquid-crystal light modulating devices 30R, 30G, and 30B modulate incident color light components according to an externally input image signal so as to generate red image light, green image light, and blue image light. Although not illustrated in FIG. 1, incident-side polarizing plates are provided between the light collecting lenses 28R, 28G, and 28B, and the liquid-crystal light modulating devices 30R, 30G, and 30B, and exiting-side polarizing plates are provided between the liquid-crystal light modulating devices 30R, 30G, and 30B and the cross dichroic prism 40.

The liquid-crystal light modulating devices 30R, 30G, and 30B are transmissive liquid-crystal light modulating devices in each of which liquid crystal serving as an electrooptical substance is hermetically sealed between a pair of transparent glass substrates, and a polysilicon thin film transistor (TFT) is provided as a switching element for example. The polarizing directions of the color light components (linearly polarized light) passing through the above-described unillustrated incident-side polarizing plates are modulated by switching actions of the switching elements provided in the liquid-crystal light modulating devices 30R, 30G, and 30B, whereby red image light, green image light, and blue image light according to the image signal are produced.

The cross dichroic prism 40 combines the image lights emitted from the above-described unillustrated exiting-side polarizing plates into a color image. More specifically, the cross dichroic prism 40 is an optical component having a substantially cubic shape formed by bonding four right angle prisms. The right angle prisms are bonded to form interfaces in a substantially X-shape, and the interfaces are provided with dielectric multilayer films. The dielectric multilayer film provided on one of the interfaces reflects red light, and the dielectric multilayer film provided on the other interface reflects blue light. These dielectric multilayer films fold red light and blue light, and the traveling directions thereof are caused to coincide with the traveling direction of green light, so that three lights are combined into a color image. The projection optical system 50 enlarges and projects the color image formed by the cross dichroic prism 40 onto the screen SCR.

The control device 60 includes a signal processing unit 61, a PWM-signal generating unit 62, a light-source driving unit 63, a rotating-phosphor-plate driving unit 64, and a liquid-crystal driving unit 65. The control device 60 processes an externally input image signal V1, and controls the solid-state light source 11, the rotating phosphor plate 13 (motor 14), and the liquid-crystal light modulating devices 30R, 30G, and 30B according to various information obtained by processing the image signal V1. In the first embodiment, the control device 60 controls the quantity of light emitted from the solid-state light source 11 by PWM control of the solid-state light source 11.

The signal processing unit 61 conducts signal processing on the externally input image signal V1 to acquire information necessary to control the solid-state light source 11, the rotating phosphor plate 13 (motor 14), and the liquid-crystal light modulating devices 30R, 30G, and 30B. More specifically, the signal processing unit 61 extracts a brightness parameter indicating a representative brightness of an image to be displayed on the basis of the image signal V1, and outputs the brightness parameter as a control signal C1 for controlling the solid-state light source 11.

Further, the signal processing unit 61 conducts expansion processing on the image signal V1 on the basis of the extracted brightness parameter, and outputs the expanded image signal as an image signal V2. For example, when an image that can be displayed on the basis of the image signal V1 has 255 gray levels and the extracted brightness parameter indicates the 200th gray level, the image signal V1 is multiplied by a coefficient alpha (=255/200). Such expansion processing is performed to display a high-contrast image by maximizing the dynamic ranges of the liquid-crystal light modulating devices 30R, 30G, and 30B.

Still further, the signal processing unit 61 outputs a rotation control signal C2 for controlling the rotation speed of the rotating phosphor plate 13 (motor 14) while monitoring a rotation detection signal (a detection signal indicating the rotation speed of the rotating phosphor plate 13 (rotation speed of the motor 14)) output from the rotating-phosphor-plate driving unit 64. Although details will be described below, in order to prevent a flicker resulting from rotation of the rotating phosphor plate 13, the signal processing unit 61 outputs the rotation control signal C2 and a control signal C1 such that the PWM control frequency of the solid-state light source 11 and the rotation speed of the rotating phosphor plate 13 have a predetermined relationship.

The PWM-signal generating unit 62 determines a duty ratio serving as a ratio of a light emitting time and a light non-emitting time in a control period of the solid-state light source 11 on the basis of the control signal C1 output from the signal processing unit 61, and generates a PWM signal S1 having the determined duty ratio. More specifically, the PWM-signal generating unit 62 includes a table (not illustrated) showing the relationship between the quantity of light emitted from the solid-state light source 11 and the duty ratio, and determines a duty ratio corresponding to the control signal C1 with reference to the table.

The above-described control period is a PWM control period in which the solid-state light source 11 is controlled by the control device 60, and is given by the reciprocal of the PWM control frequency. Here, the PWM control frequency is higher than or equal to a frame frequency (e.g., 60 Hz) of an image to be displayed on the screen SCR, and the upper limit of the PWM control frequency is about several megahertz for example. The PWM control frequency is set to be higher than or equal to the frame frequency in order to prevent a flicker resulting from PWM control of the solid-state light source 11.

The light-source driving unit 63 generates a driving signal D1 for driving the solid-state light source 11, on the basis of the PWM signal S1 generated by the PWM-signal generating unit 62. The driving signal D1 generated by the light-source driving unit 63 is a pulsed signal whose frequency, duty ratio and phase are determined on the basis of the PWM signal S1 and whose current is constant when the PWM signal S1 is on a H (high) level. The driving signal D1 is supplied to the solid-state light source 11.

The rotating-phosphor-plate driving unit 64 detects the rotation speed of the rotating phosphor plate 13 (motor 14), and outputs the detection result as a rotation detection signal to the signal processing unit 61. Also, the rotating-phosphor-plate driving unit 64 generates a driving signal D2 for driving the rotating phosphor plate 13 (motor 14), on the basis of the control signal C2 output from the signal processing unit 61, and outputs the driving signal D2 to the motor 14.

The liquid-crystal driving unit 65 generates a driving signal D3 for driving the liquid-crystal light modulating devices 30R, 30G, and 30B, from the image signal V1 expanded by the signal processing unit 61.

The signal processing unit 61 controls the solid-state light source 11 and the rotating phosphor plate 13 by generating control signals C1 and C2 that satisfy any one of the following Conditional Expressions (1) to (3):

$$A=B \quad (1)$$

$$A=2B \quad (2)$$

$$|A-B| \text{ is greater than or equal to 20 and } |A-2B| \text{ is greater than or equal to 20} \quad (3)$$

where A represents the PWM control frequency in hertz of the solid-state light source 11, and B represents the rotation frequency in hertz of the rotating phosphor plate 13 (motor 14).

That is, the signal processing unit 61 controls the solid-state light source 11 and the rotating phosphor plate 13 so that the PWM control frequency of the solid-state light source 11 is equal to the rotation frequency of the rotating phosphor plate 13, according to the above Conditional Expression (1), or so that the PWM control frequency of the solid-state light source 11 is double the rotation frequency of the rotating phosphor plate 13, according to the above Conditional Expression (2). Alternatively, the signal processing unit 61 controls the solid-state light source 11 and the rotating phosphor plate 13 according to the above Conditional Expression (3) so that the absolute value of a difference between the PWM control frequency of the solid-state light source 11 and the rotation frequency of the rotating phosphor plate 13 or the absolute value of a difference between the PWM control frequency of the solid-state light source 11 and the double of the rotation frequency of the rotating phosphor plate 13 is not less than 20 hertz.

The signal processing unit 61 performs the above-described control in order to prevent a flicker of a low-frequency component, which is visible to the user, from being caused by interference between a flicker resulting from PWM control of the solid-state light source 11 and a flicker resulting from rotation of the rotating phosphor plate 13. Here, the flicker resulting from rotation of the rotating phosphor plate 13 is caused when the intensity of phosphor light converted by the rotating phosphor plate 13 is changed according to the rotation angle of the rotating phosphor plate 13 by various factors such as in-plane unevenness in quantity of the phosphor material 13b, mounting error between the motor 14 and the rotating phosphor plate 13, and mounting error between the rotating phosphor plate 13 and the solid-state light source 11. This flicker mainly includes a high-frequency component that is invisible to the user.

FIGS. 4A and 4B show results of visual judgments of flickers caused when the PWM control frequency of the solid-state light source changes in the first embodiment of the present invention. FIG. 4A shows a result of visual judgment made when the rotation frequency of the rotating phosphor plate is 100 Hz, and FIG. 4B shows a result of visual judgment made when the rotation frequency of the rotating phosphor plate is 150 Hz. In FIGS. 4A and 4B, "OK" indicates that a flicker is not visually recognized, and "NG" indicates that a flicker is visually recognized.

In a case in which the rotation frequency of the rotating phosphor plate 13 is 100 Hz, a flicker is not visually recognized when the PWM control frequency of the solid-state light source 11 is an integer multiple of the rotation frequency of the rotating phosphor plate 13 (integer is 1 or more, 100, 200, 300 Hz), as shown in FIG. 4A. In contrast, a flicker is visually recognized when the PWM control frequency of the solid-state light source 11 is 101 to 115, 190, and 205 to 210 Hz.

Next, in a case in which the rotation frequency of the rotating phosphor plate 13 is 150 Hz, a flicker is not visually recognized when the PWM control frequency of the solid-state light source 11 is an integer multiple of the rotation frequency of the rotating phosphor plate 13 (integer is 1 or more, 150, 300, 450 Hz), as shown in FIG. 4B. In contrast, a flicker is visually recognized when the PWM control frequency of the solid-state light source 11 is 151 to 165, 290, and 305 to 310 Hz.

In this way, the results of visual judgments of FIGS. 4A and 4B show that a flicker is not visually recognized when the PWM control frequency of the solid-state light source 11 is equal to the rotation frequency of the rotating phosphor plate 13 (A=B) or is double the rotation frequency of the rotating phosphor plate 13 (A=2B). For this reason, the signal processing unit 61 controls the solid-state light source 11 and the rotating phosphor plate 13 so that any one of the above-described Conditional Expressions (1) and (2) is satisfied.

The results of visual judgments of FIGS. 4A and 4B also show that a flicker is visually recognized when the PWM control frequency of the solid-state light source 11 is higher than the rotation frequency of the rotating phosphor plate 13 and the difference therebetween is less than 20 Hz (0<(A−B)<20) or when the absolute value of the difference therebetween is less than 20 Hz (|A−2B|<20). Although not shown in FIGS. 4A and 4B, a flicker is also visually recognized when the PWM control frequency of the solid-state light source 11 is lower than the rotation frequency of the rotating phosphor plate 13 and the difference therebetween is less than 20 Hz (−20<(A−B)<0). For this reason, the signal processing unit 61 controls the solid-state light source 11 and the rotating phosphor plate 13 so that the above-described Conditional Expression (3) is satisfied.

As shown in FIGS. 4A and 4B, even when the PWM control frequency of the solid-state light source 11 slightly deviates from the rotation frequency of the rotating phosphor plate 13 or the double of the rotation frequency, a flicker is visually recognized. For this reason, to satisfy the above-described Conditional Expression (1) or (2), it is necessary to strictly control the PWM control frequency of the solid-state light source 11 and the rotation frequency of the rotating phosphor plate 13. In contrast, even if the PWM control frequency of the solid-state light source 11 or the rotation frequency of the rotating phosphor plate 13 slightly deviates, the above-described Conditional Expression (3) is often satisfied. For this reason, if the control accuracy that satisfies the above-described Conditional Expression (1) or (2) is not obtained, it is preferable to control the solid-state light source 11 and the rotating phosphor plate 13 so that the above-described Conditional Expression (3) is satisfied.

For example, the signal processing unit 61 generates a control signal C1 such that the PWM control frequency of the solid-state light source 11 becomes a frame frequency (120 Hz) of a 3-D image, and a control signal C2 such that the rotation frequency of the rotating phosphor plate 13 is 167 Hz (10000 rpm). When the PWM control frequency of the solid-state light source 11 and the rotation frequency of the rotating phosphor plate 13 are thus set, the absolute value of the difference therebetween is 47 Hz, and the above-described Conditional Expression (3) is satisfied. To display a 3-D image on the screen SCR, the liquid-crystal driving unit 65 generates a driving signal D3 that drives the liquid-crystal light modulating devices 30R, 30G, and 30B at 240 Hz.

Next, a description will be given of the operation of the projector 1 having the above-described configuration. When the projector 1 is powered on, first, the signal processing unit 61 outputs a control signal C2 to the rotating-phosphor-plate driving unit 64, whereby the rotating-phosphor-plate driving unit 64 generates a driving signal D2 to drive the motor 14, and rotation of the rotating phosphor plate 13 starts. When the rotation of the rotating phosphor plate 13 starts, the signal processing unit 61 outputs a rotation control signal C2 while monitoring a rotation detection signal output from the rotating-phosphor-plate driving unit 64, and performs control so that the rotation frequency of the rotating phosphor plate 13 becomes a constant value (167 Hz).

When the rotation frequency of the rotating phosphor plate 13 becomes the constant value, the signal processing unit 61 outputs a control signal C1 to the PWM-signal generating unit 62. Then, the PWM-signal generating unit 62 generates a PWM signal S1 based on the control signal C1, and the light-source driving unit 63 generates a driving signal D1 based on the PWM signal S1. The driving signal D1 generated by the light-source driving unit 63 is supplied to the solid-state light source 11, and the solid-state light source 11 is PWM-controlled at a PWM control frequency of 120 Hz.

While, for easy explanation, the solid-state light source 11 is PWM-controlled immediately after the rotation frequency of the rotating phosphor plate 13 becomes the constant value in the first embodiment, it may be PWM-controlled after the rotation frequency of the rotating phosphor plate 13 becomes the constant value and an image signal V1 is then input. If the rotation frequency of the rotating phosphor plate 13 considerably decreases after becoming the constant value, it is preferable to stop the control of the solid-state light source 11 in order to prevent efficiency reduction, degradation, and breakage from being caused by heat generation from the phosphor material 13b in the rotating phosphor plate 13.

When the solid-state light source 11 is driven under PWM control, it emits blue light (excitation light) having the spectrum shown in FIG. 3A. The blue light emitted from the solid-state light source 11 is collected by the light collecting optical system 12 so as to be incident on the rotating phosphor plate 13 that is being rotated by the motor 14. A part of the blue light incident on the rotating phosphor plate 13 is converted by the phosphor material 13b of the rotating phosphor plate 13 into yellow light (phosphor light) including red light (R) and green light (G), and the other part of the blue light passes through the phosphor material 13b.

The blue light passing through the phosphor material 13b and the yellow light (red light and green light) converted by the phosphor material 13b are converted by the collimator optical system 15 into substantially parallel light, and are uniformized by sequentially passing through the elements from the first lens array 16 to the superimposing lens 19, and the polarization state thereof is controlled, so that the lights are emitted as white light from the illumination device 10. The white light emitted from the illumination device 10 is split into red light, green light, and blue light by the color separating and guiding optical system 20. The separated red light, green light, and blue light enter the liquid-crystal light modulating devices 30R, 30G, and 30B, respectively.

The red light, green light, and blue light incident on the liquid-crystal light modulating devices 30R, 30G, and 30B are modulated by driving the liquid-crystal light modulating devices 30R, 30G, and 30B, respectively, whereby red image light, green image light, and blue image light are generated. Here, the liquid-crystal light modulating devices 30R, 30G, and 30B are driven at a frequency of 240 Hz according to a driving signal D3 generated on the basis of an image signal V2 that is obtained by conducting expansion processing on an image signal V1 in the signal processing unit 61. The image lights generated by the liquid-crystal light modulating devices 30R, 30G, and 30B are combined into a color image by the cross dichroic prism 40, and the color image is enlarged and projected onto the screen SCR by the projection optical system 50. Thus, the image according to the externally input image signal is displayed on the screen SCR.

Next, a more detailed description will be given of the control of the solid-state light source 11 and the liquid-crystal light modulating devices 30R, 30G, and 30B performed in the control device 60. FIG. 5 is a timing chart illustrating signals used in the projector 1 of the first embodiment. FIG. 5 illustrates a vertical synchronizing (VSYNC) signal included in an image signal V2, image data and a scan signal included in a driving signal D3, a driving signal D1, and control signals (left-lens control signal and right-lens control signal) for controlling glasses that the user wears to view a 3-D image. In the following, the signals of FIG. 5 will first be described, and the control of the solid-state light source 11 and the liquid-crystal light modulating devices 30R, 30G, and 30B will be then described in detail.

As illustrated in FIG. 5, a VSYNC signal included in an image signal V2 has a frequency of 120 Hz and a period length T1 of 8.33 msec. This is because image light for the left eye and image light for the right eye need to be projected onto the screen SCR by 60 frames per second in order to display a 3-D image on the screen SCR. Image data included in a driving signal D3 is such that left-eye image data L and right-eye image data R alternate every other period of the VSYNC signal.

A scan signal sequentially scans the liquid-crystal light modulating devices 30R, 30G, and 30B twice during one period of the VSYNC signal. FIG. 5 does not illustrate the scan signal itself, but illustrates scanning positions where the liquid-crystal light modulating devices 30R, 30G, and 30B are scanned by the scan signal, for easy understanding. More specifically, in a graph in FIG. 5 illustrating the scan signal, the vertical axis indicates the scanning position of the liquid-crystal light modulating devices 30R, 30G, and 30B, and the horizontal axis indicates the time. When the liquid-crystal light modulating devices 30R, 30G, and 30B are scanned sequentially, the relationship between the position and time where scanning starts is represented by oblique lines L1 and L2.

In each of the liquid-crystal light modulating devices 30R, 30G, and 30B, in response to the above-described scan signal, an image for the left eye is scanned twice during one period of the VSYNC signal, and an image for the right eye is subsequently scanned twice in one period of the VSYNC signal. Such scanning is performed to prevent the image for the left eye and the image for the right eye from being mixed when the liquid-crystal light modulating devices 30R, 30G, and 30B are scanned sequentially.

That is, when the liquid-crystal light modulating devices 30R, 30G, and 30B are sequentially scanned, for example, even if scanning of the image for the right eye starts in upper parts of the liquid-crystal light modulating devices 30R, 30G, and 30B, image data for the left eye is still held in lower parts of the liquid-crystal light modulating devices 30R, 30G, and 30B, and the image for the left eye and the image for the right eye are mixed. If these mixed images are perceived by the user, a 3-D image gives a sense of discomfort to the user. Hence, the liquid-crystal light modulating devices 30R, 30G, and 30B are scanned sequentially and twice in order to avoid such a situation.

A driving signal D1 drives the solid-state light source 11, and is generated on the basis of a PWM signal S1 having a duty ratio that is determined on the basis of a control signal C1. As illustrated in FIG. 5, in every period of the VSYNC signal, the driving signal D1 rises after the second scan is started according to the scan signal, and falls after at the completion of a frame. The time at which the driving signal D1 rises varies according to the duty ratio determined on the basis of the control signal C1.

A left-lens control signal and a right-lens control signal are output from the signal processing unit 61, and respectively control the transmittances of a portion of the glasses worn by the user located on the left eye side (left lens) and a portion of the glasses located on the right eye side (right lens). The left-lens control signal increases the transmittance of the left lens to bring the left lens into an open state when image light for the left eye is projected on the screen SCR, and decreases the transmittance of the left lens to bring the left lens into a closed state when image light for the right eye is projected. Contrary to the left-lens control signal, the right-lens control signal decreases the transmittance of the right lens to bring the right lens into a closed state when image light for the left eye is projected on the screen SCR, and increases the transmittance of the right lens to bring the right lens into an open state when image light for the right eye is projected.

As illustrated in FIG. 5, each of the left-lens control signal and the right-lens control signal rises before the second scan is started according to the scan signal, and falls at the completion of a frame. The left-lens control signal and the right-lens control signal rise before the start of the second scan in consideration of the response speed of the left lens and the right lens. Further, the left-lens control signal and the right-lens control signal fall at the completion of the frame in order to prevent the image for the left eye and the image for the right eye from being perceived in a mixed state by the user.

When a driving signal D3 including the left-eye image data L and the scan signal in FIG. 5 is output from the liquid-crystal driving unit 65, a first scan of the image for the left eye starts in each of the liquid-crystal light modulating devices 30R, 30G, and 30B. At a predetermined time between the start and end of the first scan of the image for the left eye, the signal processing unit 61 outputs a left-lens control signal to the unillustrated glasses worn by the user, thereby bringing the left lens into an open state. Since a right-lens control signal is not output to the glasses, the right lens remains in a closed state.

As illustrated in FIG. 5, a driving signal D1 is not output during the first scan of the image for the left eye, and therefore, the solid-state light source 11 does not emit blue light. Hence, the liquid-crystal light modulating devices 30R, 30G, and 30B do not generate any of red image light, green image light, and blue image light, and an image is not displayed on the screen SCR. For this reason, even when the left lens is in an open state, the user does not perceive the image for the left eye.

When the first scan of the image for the left eye is completed, a second scan of the image for the left eye starts subsequently. At the completion of the first scan, the liquid-crystal light modulating devices 30R, 30G, and 30B hold only left-eye image data L. When the second scan starts, the light-source driving unit 63 outputs a driving signal D1 to the solid-state light source 11 at a predetermined time, whereby the solid-state light source 11 emits blue light having a light quantity corresponding to the duty ratio of the driving signal D1. As described above, a part of the blue light from the solid-state light source 11 is converted into yellow light (red light and green light) by the phosphor material 13b, and the remaining part thereof passes through the phosphor material 13b.

When these color lights enter the liquid-crystal light modulating devices 30R, 30G, and 30B, red image light, green image light, and blue image light are generated in accordance with the image for the left eye, and are projected on the screen SCR to display the image for the left eye on the screen SCR. In this case, since the left lens is in an open state and the right lens is in a closed state in the glasses worn by the user, the image for the left eye displayed on the screen SCR is perceived by only the left eye of the user. When the second scan of the image for the left eye is completed, both of the driving signal D1 and the left-lens control signal fall, emission of the blue light from the solid-state light source 11 is stopped, and the left lens is brought into a closed state.

Further, when the second scan of the image for the left eye is completed, the liquid-crystal driving unit 65 outputs a driving signal D3 including right-eye image data R and the scan signal in FIG. 5, and a first scan of an image for the right eye starts in each of the liquid-crystal light modulating devices 30R, 30G, and 30B. At a predetermined time between the start and end of the first scan of the image for the right eye, the signal processing unit 61 outputs a right-lens control signal to the glasses worn by the user, so that the right lens is brought into an open state. Since a left-lens control signal is not output to the glasses, the left lens remains in a closed state.

Similarly to the first scan of the image for the left eye, a driving signal D1 is not output during the first scan of the image for the right eye, and therefore, the solid-state light source 11 does not emit blue light. Hence, the liquid-crystal light modulating devices 30R, 30G, and 30B do not generate any of red image light, green image light, and blue image light, and an image is not displayed on the screen SCR. For this reason, even when the right lens is in the open state, the image for the right eye is not perceived by the user.

When the first scan of the image for the right eye is completed, a second scan of the image for the right eye is subsequently starts. At the completion of the first scan, the liquid-crystal light modulating devices 30R, 30G, and 30B hold only image data for the right eye. When the second scan starts, the light-source driving unit 63 outputs a driving signal D1 to the solid-state light source 11 at a predetermined time, whereby the solid-state light source 11 emits blue light having a light quantity corresponding to the duty ratio of the driving signal D1. As described above, a part of the blue light from the solid-state light source 11 is converted into yellow light (red light and green light) by the phosphor material 13b, and the remaining part thereof passes through the phosphor material 13b.

When these color lights enter the liquid-crystal light modulating devices 30R, 30G, and 30B, red image light, green image light, and blue image right corresponding to the image for the right eye are generated and projected onto the screen SCR. Thus, the image for the right eye is displayed on the screen SCR. In this case, the right lens of the glasses worn by the user is in an open state, and the left lens is in a closed state. Hence, the image for the right eye displayed on the screen SCR is perceived by only the right eye of the user. When the second scan of the image for the right eye is completed, both of the driving signal D1 and the right-lens control signal fall, emission of blue light from the solid-state light source 11 is stopped, and the right lens is brought into a closed state.

When the second scan of the image for the right eye is completed, the liquid-crystal driving unit 65 outputs a driving signal D3 including the left-eye image data L and the scan signal in FIG. 5, and scanning starts similarly. As illustrated in FIG. 5, the driving signal D3 including the left-eye image data L and the scan signal and the driving signal D3 including the right-eye image data R and the scan signal are alternately output every other period of the VSYNC signal, and similar operations are performed.

As described above, in the first embodiment, the signal processing unit 61 controls the solid-state light source 11 and the rotating phosphor plate 13 by generating control signals C1 and C3 so that the PWM control frequency of the solid-state light source 11 and the rotation frequency of the rotating phosphor plate 13 satisfy any one of the above-described Conditional Expressions (1) to (3). For this reason, it is possible to prevent a flicker from being caused by PWM control of the solid-state light source 11 and rotation of the rotating phosphor plate 13.

Second Embodiment

Next, a projector according to a second embodiment of the present invention will be described. An overall configuration of the projector of the second embodiment is substantially similar to that of the projector 1 illustrated in FIG. 1. However, the projector of the second embodiment is different from the projector 1 of FIG. 1 in that the solid-state light source 11 is continuously driven without PWM control, that the liquid-crystal light modulating devices 30R, 30G, and 30B are subjected to digital driving, and that the rotation frequency of the rotating phosphor plate 13 and the driving frequency of the liquid-crystal light modulating devices 30R, 30G, and 30B are kept in a predetermined relationship.

That is, the projector of the second embodiment includes a light-source driving unit for continuously driving a solid-state light source 11, instead of the PWM-signal generating unit 62 and the light-source driving unit 63 illustrated in FIG. 1, and includes a liquid-crystal driving unit capable of digital driving, instead of the liquid-crystal driving unit 65. The projector also includes, instead of the signal processing unit 61, a signal processing unit that performs control to maintain a predetermined relationship between the rotation frequency of a rotating phosphor plate 13 and the driving frequency of liquid-crystal light modulating devices 30R, 30G, and 30B. While the projector of the second embodiment can display a 3-D image, similarly to the projector 1 of FIG. 1, a case in which a two-dimensional (2-D) image is displayed will be given below as an example for easy explanation.

Here, the term "digital driving" refers to a driving method in which the liquid-crystal light modulating devices 30R, 30G, and 30B are driven while changing the ratio of the time in which light from the rotating phosphor plate 13 (red light, green light, or blue light) is transmitted and the time in which the light is not transmitted, in accordance with the gray level of an image to be displayed on the screen SCR. That is, the digital driving method expresses the gray level of the image by a time integral effect of light passing through the liquid-crystal light modulating devices 30R, 30G, and 30B, unlike the driving method adopted in the projector 1 of FIG. 1 in which the gray level of the image is expressed by changing the transmittances of the liquid-crystal light modulating devices 30R, 30G, and 30B.

A signal processing unit provided in a control device 60 controls the rotating phosphor plate 13 and the liquid-crystal light modulating devices 30R, 30G, and 30B by generating a control signal that satisfies any one of the following Conditional Expressions (4) and (5):

$$n \times C = 2B \text{ ($n$ is any one of integers of 1 or more)} \qquad (4)$$

$$|(n/2) \times C - B| \text{ is greater than or equal to 20 ($n$ is all integers of 1 or more)} \qquad (5)$$

where B represents the rotation frequency in hertz of the rotating phosphor plate 13 (motor 14), and C represents the driving frequency in hertz of the liquid-crystal light modulating devices 30R, 30G, and 30B.

That is, the signal processing unit controls the rotating phosphor plate 13 and the liquid-crystal light modulating devices 30R, 30G, and 30B according to the above-described Conditional Expression (4) so that the rotation speed of the rotating phosphor plate 13 is equal to (n/2) times the driving frequency of the liquid-crystal light modulating devices 30R, 30G, and 30B. Alternatively, the signal processing unit controls the rotating phosphor plate 13 and the liquid-crystal light modulating devices 30R, 30G, and 30B according to the above-described Conditional Expression (5) so that the absolute value of a difference between the rotation frequency of the rotating phosphor plate 13 and (n/2) times the driving frequency of the liquid-crystal light modulating devices 30R, 30G, and 30B is not less than 20 Hz.

The above Conditional Expression (5) specifies that the rotating phosphor plate 13 and the liquid-crystal light modulating devices 30R, 30G, and 30B are controlled so as to satisfy conditional expressions $|(1/2) \times C-B|$ is greater than or equal to 20, $|(2/2) \times C-B|$ is greater than or equal to 20, $|(3/2) \times C-B|$ is greater than or equal to 20, . . . and $|(n/2) \times C-B|$ is greater than or equal to 20. In other words, Conditional Expression (5) specifies that the rotating phosphor plate 13 and the liquid-crystal light modulating devices 30R, 30G, and 30B are controlled so as not to satisfy conditional expressions $$|(1/2) \times C-B|<20, |(2/2) \times C-B|<20, |(3/2) \times C-B|<20, \ldots, \text{ or } |(n/2) \times C-B|<20.$$

The signal processing unit performs the above control in order to prevent a flicker of a low-frequency component, which is visible to the user, from being caused by interference between a flicker resulting from rotation of the rotating phosphor plate 13 and a flicker resulting from digital driving of the liquid-crystal light modulating devices 30R, 30G, and 30B. Here, the flicker resulting from digital driving of the liquid-crystal light modulating devices 30R, 30G, and 30B includes a frequency component of an integer multiple (integer is 1 or more) of the driving frequency of the liquid-crystal light modulating devices 30R, 30G, and 30B. For this reason, according to Conditional Expression (5), the signal processing unit controls the rotating phosphor plate 13 and the liquid-crystal light modulating devices 30R, 30G, and 30B so that the absolute value of the difference between the rotation frequency of the rotating phosphor plate 13 and the frequency given by $(n/2) \times C$ is not less than 20 Hz.

The above-described driving frequency C of the liquid-crystal light modulating devices 30R, 30G, and 30B is equal to the frame frequency of an image to be displayed on the screen SCR. For example, when a 2-D image is displayed on the screen SCR according to the National Television System Committee (NTSC) standard, the driving frequency C is set at 60 Hz that is equal to the frame frequency. When a 3-D image is displayed on the screen SCR, the driving frequency C is set at 120 Hz.

Next, the operation of the projector of the second embodiment will be described. Broadly speaking, the projector of the second embodiment is different from the projector 1 of FIG. 1 in the driving methods for the solid-state light source 11 and the liquid-crystal light modulating devices 30R, 30G, and 30B, but the other operations are basically similar to those adopted in the projector 1 of FIG. 1. Hence, the following description will be mainly given of the control of the rotating phosphor plate 13 and the liquid-crystal light modulating devices 30R, 30G, and 30B. FIG. 6 is a timing chart illustrating signals used in the projector of the second embodiment.

FIG. 6 illustrates the intensity of light emitted from the tops of the liquid-crystal light modulating devices 30R, 30G, and 30B, in addition to a vertical synchronizing (VSYNC) signal included in an image signal V2, image data included in a driving signal D3, a scan signal, and an SF code. Hereinafter, the signals illustrated in FIG. 6 will be first described, and the control of the rotating phosphor plate 13 and the liquid-crystal light modulating devices 30R, 30G, and 30B will then be described.

As illustrated in FIG. 6, a VSYNC signal included in an image signal V2 has a frequency of 60 Hz and a period length T2 of 16.67 msec. This frequency is equal to a frame frequency used in the above-described case in which a 2-D image is displayed according to the NTSC standard. Image data in a driving signal D3 includes image data corresponding to frames arranged in time series.

A scan signal repeats twice scan of the liquid-crystal light modulating devices 30R, 30G, and 30B at a predetermined time interval (first to sixth scanning operations). A similar scan is thus repeated twice in one period of the VSYNC signal in order to reverse the polarity in scan. Similarly to the scan signal of FIG. 5, the scan signal of FIG. 6 does not illustrate a scan signal itself, but illustrates the scanning positions where scans of the liquid-crystal light modulating devices 30R, 30G, and 30B start in response to the scan signal. The time interval of the scanning operations of the liquid-crystal light modulating devices 30R, 30G, and 30B in response to the scan signal is set to be a two's power ($2^n$) for example.

That is, when it is assumed that a time from when a first scanning operation starts to when a second scanning operation starts is set at 1, a time from when the second scanning operation starts to when a third scanning operation starts is set at 2, and a time from when the third scanning operation starts to when a fourth scanning operation starts is set at 4. Similarly, a time from when the fourth scanning operation starts to when a fifth scanning operation starts is set at 8, and a time from when the fifth scanning operation starts to when a sixth scanning operation starts is set at 16. A time from when the sixth scanning operation starts to when the next scan (a first scanning operation in the second scan) starts is set at 32.

As for the relationship between the position and time where scanning starts in response to the above-described scan signal, the first scan is shown by oblique lines L11 to L16 and the second scan is shown by oblique lines L21 to L26 in FIG. 6. While a set of six scanning operations is repeated twice at the predetermined time interval in one period of the VSYNC signal in the example of FIG. 6, other scanning methods can be used. For example, the number of scanning operations in the first scan may be increased and repetition may be eliminated, or the number of scanning operations in the first scan may be decreased and the number of repetitions may be increased.

An SF code indicates the gray level, and specifies whether the transmittances of the liquid-crystal light modulating devices 30R, 30G, and 30B are increased (an open state is set) or decreased (a closed state is set) in each scan according to the above scan signal. For easy explanation, the SF code of FIG. 6 brings the liquid-crystal light modulating devices 30R, 30G, and 30B into an open state in the first to fifth scanning operations and brings the liquid-crystal light modulating devices 30R, 30G, and 30B into a closed state in the sixth scanning operation in each of the first and second scans within each period of the VSYNC signal.

When the scan signal and the SF code in FIG. 6 are used, the intensity of light emitted from the tops of the liquid-crystal light modulating devices 30R, 30G, and 30B gradually increases from a time at which the first scanning operation in each of the first and second scans starts and gradually decreases from a time at which the sixth scanning operation starts, in each period of the VSYNC signal. The light intensity thus gradually changes because of the response speed of the liquid-crystal light modulating devices 30R, 30G, and 30B.

When the liquid-crystal driving unit in the control device 60 outputs a driving signal D3 including the image data, the scan signal, and the SF code described above with reference to FIG. 6, the first scan starts in each of the liquid-crystal light modulating devices 30R, 30G, and 30B. Here, the liquid-crystal light modulating devices 30R, 30G, and 30B are driven by using the frame frequency of 60 Hz as the reference, and the rotation frequency of the rotating phosphor plate 13 is set at 150 Hz for example. Such setting satisfies the above-described Conditional Expressions (4) and (5), and therefore, a visible flicker is avoided.

In the first scan, the liquid-crystal light modulating devices 30R, 30G, and 30B are scanned a total of six times at the above-described time interval. Here, the SF code of FIG. 6 is on the H level in the first to fifth scanning operations and is on the L level in the sixth scanning operation. For this reason, the intensity of light emitted from the tops of the liquid-crystal light modulating devices 30R, 30G, and 30B gradually increases from the start of the first scanning operation and gradually decreases from the start of the sixth scanning operation, as illustrated in FIG. 6.

When the first scan of the liquid-crystal light modulating devices 30R, 30G, and 30B is completed, a second scan of the liquid-crystal light modulating devices 30R, 30G, and 30B is started while the polarity is reversed. In the second scan, the liquid-crystal light modulating devices 30R, 30G, and 30B are also scanned a total of six times at a time interval similar to that adopted in the first scan. Since an SF code used in the second scan is the same as that used in the first scan, the intensity of light emitted from the tops of the liquid-crystal light modulating devices 30R, 30G, and 30B gradually increases from the start of a first scanning operation and gradually decreases from the start of a sixth scanning operation, as illustrated in FIG. 6. Subsequently, a similar operation is performed in every period of the VSYNC signal, and a 2-D image is displayed on the screen SCR according to the input image signal.

As described above, in the second embodiment, the control device 60 controls the rotating phosphor plate 13 and the liquid-crystal light modulating devices 30R, 30G, and 30B so that the rotation frequency of the rotating phosphor plate 13 and the driving frequency of the liquid-crystal light modulating devices 30R, 30G, and 30B satisfy any one of the above-described Conditional Expressions (4) and (5). For this reason, it is possible to prevent a flicker from being caused by rotation of the rotating phosphor plate 13 and digital driving of the liquid-crystal light modulating devices 30R, 30G, and 30B.

While the projectors according to the embodiments of the present invention have been described above, the present invention is not limited to the above embodiments, and modifications can be freely made within the scope of the invention. For example, the following modifications can be made.

(1) While the liquid-crystal light modulating device is used as the light modulating device in the above embodiment, the present invention is not limited thereto. In general, it is satisfactory as long as the light modulating device modulates incident light according to an image signal. For example, a light valve or a micromirror optical modulator may be used. As the micromirror optical modulator, for example, a digital micromirror device (DVD) (trademark of Texas Instruments Inc.) or a liquid crystal on silicon (LCOS) may be used.

(2) While the above embodiments adopt the solid-state light source 11 for emitting blue light as excitation light and the rotating phosphor plate 13 for converting a part of the blue light from the solid-state light source 11 into red light and green light, the present invention is not limited thereto. For example, a solid-state light source for emitting violet light or ultraviolet light as excitation light and a rotating phosphor plate for generating color light including red light, green light, and blue light from the violet light or the ultraviolet light may be provided.

(3) While the transmissive projector is adopted as the projector in the above embodiments, the present invention is not limited thereto. For example, the present invention is also applicable to a reflective projector. Here, the term "transmissive" means that the light modulating device transmits light like a transmissive liquid crystal display, and the term "reflective" means that the light modulating device reflects light like a reflective liquid crystal display. Even when the present invention is applied to the reflective projector, advantages similar to those of the transmissive projector can be obtained.

(4) While the projector uses three liquid-crystal light modulating devices in the above embodiments, the present invention is not limited thereto. The present invention is also applicable to a projector that uses one, two, or four or more liquid-crystal light modulating devices.

(5) The present invention is applicable to a front projection projector that projects a projection image from a viewing side and a rear projection projector that projects a projection image from a side opposite the viewing side.

REFERENCE SIGNS LIST 1 projector
11 solid-state light source
13 rotating phosphor plate
13a disc
13b phosphor material
14 motor
30R, 30G, 30B liquid-crystal light modulating device
50 projection optical system
60 control device
SCR screen

What is claimed is:

1. A projector comprising:
a solid-state light source that emits excitation light;
a rotating phosphor plate that converts a part of the excitation light into phosphor light, and transmits the remaining part of the excitation light;
a light modulating device that modulates the light from the rotating phosphor plate;
a projection optical system that projects the light modulated by the light modulating device onto a screen; and
a control device that controls the solid-state light source and the rotating phosphor plate so that any one of the following conditional expressions is satisfied:

$A=B,$ $A=2B,$ or $|A-B|$ is greater than or equal to 20 and $|A-2B|$ is greater than or equal to 20, where A represents a pulse width modulation control frequency in hertz of the solid-state light source and B represents a rotation frequency in hertz of the rotating phosphor plate,
wherein in the rotating phosphor plate, a phosphor material serving as a single phosphor layer is provided on one surface of a disc continuously in a circumferential direction of the disc.

2. The projector according to claim 1, wherein the pulse width modulation control frequency of the solid-state light source is higher than or equal to a frame frequency of an image to be displayed on the screen.

3. A projector comprising:
a solid-state light source that emits excitation light;
a rotating phosphor plate that converts a part of the excitation light into phosphor light, and transmits the remaining part of the excitation light;
a light modulating device that modulates the light from the rotating phosphor plate;
a projection optical system that projects the light modulated by the light modulating device onto a screen; and
a control device that controls the rotating phosphor plate and the light modulating device so that any one of the following conditional expressions is satisfied:

$n \times C = 2B$ ($n$ is any one of integers of 1 or more), or $|(n/2) \times C - B|$ is greater than or equal to 20 ($n$ is any of integers of 1 or more), where B represents a rotation frequency in hertz of the rotating phosphor plate and C represents a driving frequency in hertz of the light modulating device.

4. The projector according to claim 3, wherein the driving frequency of the light modulating device is equal to a frame frequency of an image to be displayed on the screen.

5. The projector according to claim 3, further comprising: a driving unit that conducts digital driving on the light modulating device while changing a ratio of a time in which the light from the rotating phosphor plate is transmitted and a time in which the light is not transmitted, according to a gray level of an image to be displayed on the screen.

6. The projector according to claim 1, wherein the rotating phosphor plate includes a phosphor material that converts the excitation light into the phosphor light and that is continuously provided in a circumferential direction of a disc to be rotated by a motor.

7. The projector according to claim 6, wherein the solid-state light source emits blue light as the excitation light, and wherein the phosphor material converts the blue light from the solid-state light source into light including at least green light.

8. The projector according to claim 7, wherein the phosphor material converts the blue light from the solid-state light source into light including red light and green light.

9. The projector according to claim 6, wherein the solid-state light source emits violet light or ultraviolet light as the excitation light, and wherein the phosphor material converts the violet light or the ultraviolet light from the solid-state light source into light including at least green light.

10. The projector according to claim 9, wherein the phosphor material converts the violet light or the ultraviolet light from the solid-state light source into light including red light, green light, and blue light.

* * * * *